Nov. 7, 1967  R. SAUR  3,351,279
THERMOSTATIC VALVE
Filed Sept. 15, 1965

Inventor:
ROLAND SAUR
BY Robert H Jacob
AGT.

United States Patent Office 3,351,279
Patented Nov. 7, 1967

3,351,279
THERMOSTATIC VALVE
Roland Saur, Stuttgart, Germany, assignor to Behr-Thomson Dehnstoffregler GmbH, Stuttgart, Germany, a firm
Filed Sept. 15, 1965, Ser. No. 487,358
Claims priority, application Germany, May 31, 1965, B 82,178
8 Claims. (Cl. 236—34)

ABSTRACT OF THE DISCLOSURE

A thermostatic valve having an expansion element with an operating piston and a support for said piston, a biasing spring, a valve member operable by the expansion element, and where a support is provided by downwardly extending arms, at least one of which is movable to facilitate the assembly, particularly the insertion of the expansion element with the biasing spring.

---

Figure 1:
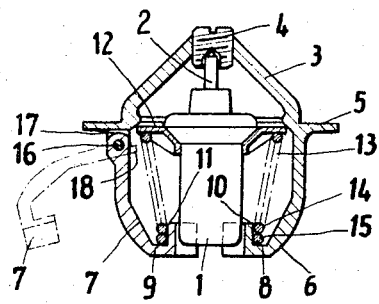

The invention relates to valves for controlling the flow of cooling agents in internal combustion engines. More in particular, the invention relates to a thermostatic valve for use in such engines having a valve seating ring, an element of expansible material and supports for the piston of the expansible element and for a closure spring, which comprise an upper and lower shackle and a valve disk actuated by the expansible element.

Thermostatic valves of this type are generally mass produced articles made with the intent of simplifying and rationalizing the production and the installation as much as possible.

The assembling of the parts valve seat ring, support for the piston element and support for the closure spring, heretofore was effected in a manner that both supports were placed in an aperture in the valve seat ring and connected with one another by means of a riveting or a shrinking operation. Subsequently these areas are also soldered. It is the task of a thermostatic valve in a circuit of coolant flow in the motor of a vehicle to also close the valve of the liquid to the radiator of the vehicle below the desired operating temperature. Now, if the connection between the above mentioned three individual components is not produced with particular care, there is always the danger of the penetration of leakage water at these locations. Especially when the external temperatures are low, this leakage water can result, in that the motor of the vehicle reaches the required operating temperature only slowly or, in the most unfavorable cases, not at all. As a result there appear the known high wear phenomena in the engine which are caused by cold operation.

It is therefore an object of the invention to construct, on the one hand, a thermostatic valve of the type mentioned above in a manner that the installation is limited to a minimum of working operations while such operations can be carried out by unskilled help and, on the other hand, to preclude functional shortcomings at the same time.

In accordance with the invention the problem is solved in that the lower shackle is made of individual arms which have centering means known per se for the closure spring and for the guide means for the expansible element, and that at least one of the arms is movable and the other one or ones rigidly connected with the valve seat ring. In this connection the construction can be effected in a modification of the invention in such a manner that both or all dowwardly directed arms are movably arranged. In this manner it is accomplished that the expansible element can be pre-assembled with the piston and the valve disk, and the unit thus formed together with the closure spring which is suitably held by clamps, can be slid into the remaining part of the valve consisting of the valve seat ring and the lower and upper shackle or bracket parts. It is then merely necessary to release the clamp which holds the spring, whereby the spring is permitted to automatically engage its support by means of the centering part at the lower shackle, while simultaneously the expansible element can be centrally guided. In accordance with the invention the final mounting operation is therefore limited to a single working operation, i.e., the insertion of the pre-assembled inner part into the valve seat ring arrangement.

In an advantageous further development of the invention the movable arm is mounted at the lower side of the valve seat ring. By arranging for the accommodation of the arm or arms at the lower part of the valve seat ring any breaking through the valve seat ring is avoided, and thus the disadvantageous penetration of leakage water at these locations is eliminated.

In a particularly advantageous embodiment of the invention at least one of the arms is journalled or secured for radial movement on the valve seat ring. In that case the mounting is achieved either in a manner that the movable arm is secured in place for pivotal movement by means of a pin or in accordance with another embodiment of the invention, by means of a guiding arrangement (for example, T-shaped guide slot) at the valve seat and a suitably formed lower end of the movable arm.

This embodiment permits, by slightly inclining the assembly, to insert the pre-assembled part comprising the expansion element, piston and valve disk from the bottom into the valve seat arrangement also where the longitudinal dimension of the valve is very short. For the completion of the installation it is then only necessary to move the pivotally mounted arm in the direction of the axis of the valve and then remove the clamps which retain the spring. Thereupon the spring positions itself automatically by virtue of the centering means on the supports formed by the lower arms and simultaneously the guiding for the expansion element is completed.

In order to achieve the secure engagement for the closure spring and safe guidance for the expansion element also when merely two lower arms are used, a further advantageous embodiment of the invention provides that a sector-shaped horizontal support surface is arranged at the lower ends of the arms. To obtain proper centering of the closure spring an arcuate border strip may be provided in accordance with the invention at the supporting surfaces of the lower ends of the arms. In this connection it is suitable that the border strip is of such height that it corresponds substantially to the height of two turns of the closure spring.

By virtue of a particularly advantageous arrangement of the movable arm or arms in radial direction as described, and by suitably choosing the dimension of the height of the centering edge for the closure spring at these arms, a further feature of the invention becomes effective. This resides in that the "engaged turns" by means of which the closure spring is simultaneously centered, also take care of fixing the movable arm or arms in place. Thus an additional securing member for retaining the movable arm or arms in the mounted position is eliminated.

In accordance with a still further object of the invention the engagement surfaces of the lower arms are constructed in such a manner that they correspond to a centering angle of about 120°.

Figure 2:
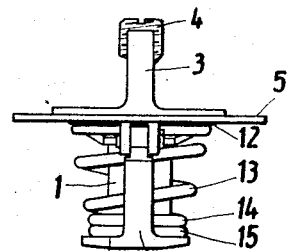
Figure 3A:
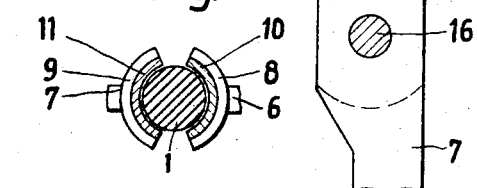
Figure 3B:
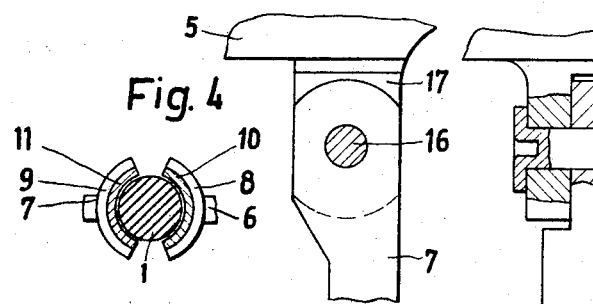
Figure 4:
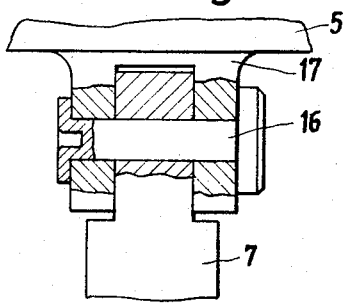
Figure 5:
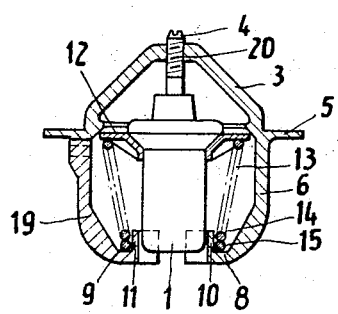
Figure 6:
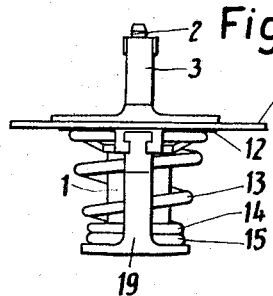
Figure 7A:
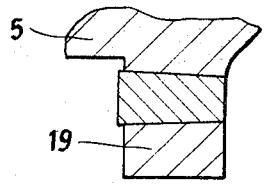
Figure 7B:
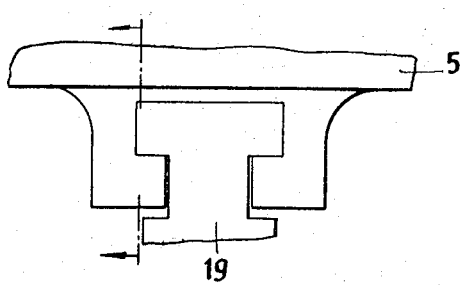

Further advantages and details of the invention will become apparent from the following description with reference to the drawings, which schematically illustrate various embodiments of the invention and in which FIG. 1 is a side view of a first embodiment of the invention having a pivotable lower arm, FIG. 2 is a side view taken at a 90° angle from the left side of FIG. 1, FIGS. 3a and 3b are fractional views showing details of FIGS. 1 and 2 to an enlarged scale, FIG. 4 is a plan view showing the lower ends of the arms, FIG. 5 is a side view of a second embodiment where the movable arm is engaged, FIG. 6 is a side view taken at a 90° angle from the left of FIG. 5, and FIGS. 7a and 7b are fractional views of details shown to an enlarged scale.

A thermostatic valve of the type considered here comprises generally an expansion element 1 where temperature sensitive expansion material is arranged in a housing which expands when it is heated and thus effects a relative displacement between element 1 and a piston 2. The arrangement is made in such a manner that the pistion 2 is supported against the upper shackle 3 of the valve by means of an insert member 4. The insert member 4 is in the form of a set screw and serves for adjusting the setting of the expansion element. The shackle 3 is provided on a valve seat ring 5 and is preferably formed as a unitary structure with this seat ring 5. Arms 6 and 7 extend downwardly from the valve seat ring 5 and are provided at their lower ends with horizontal supporting surfaces 8 and 9. At the inner end of the arms border strips 10 and 11 are provided.

The expansion element 1 is suitably connected with the valve disk 12. A closure spring 13 rests at one end against the valve disk 12 and at the other end against the supporting surfaces 8 and 9 of the arms 6 and 7.

If the medium surrounding the expansion element 1 is heated, then the expansible material expands and the element 1 together with the valve disk 12 is displaced downwardly against the pressure of spring 13 owing to the firm support of the piston 2 in the shackle 3. As a result the valve is opened by disengaging the valve disk 12 from the valve seat ring 5. The border strips 10 and 11 serve for the central guidance of the expansion element during its movement. These border strips 10 and 11, however, serve simultaneously for supporting the closure spring 13, which spring in accordance with the proposed improvement constitutes at the same time a securing member for the radially movable arm or arms and keeps the same fixedly in the operative position. Advantageously the height of the border strips 10 and 11 is so chosen that it corresponds to the height of two turns 14 and 15 of the closure spring 13.

FIG. 1 indicates in dot and dash lines that the arm 7 is pivotally mounted on the valve seat ring 5, and that in such a manner that it is able to effect a movement in a radial plane relative to the expansion element 1. The pivotal movement is made possible by connecting the arm 7 by means of a pin 16 with a suitably formed part 17 of the valve seat ring 5. As shown in FIG. 1 the arm 7 may have an abutment lug 18 at its upper end.

The mounting of a thermostatic valve of the type in accordance with FIGS. 1 to 4 is suitably effected in a manner that first the expansion element is combined with the valve disk 12 and then the lock spring 13 is slid over the assembly. The spring 13 can be retained in its desired position by means of a clamp. The pre-assembled unit is then slid somewhat obliquely from the bottom into the valve seat ring 5 while the piston 2 engages the insert member 4. Subsequently the arm 7 is swung downwardly so that the border strips 10 and 11 completely guide the expansion element 1. Now if the clamp is removed, the spring 13 is allowed to expand and the two turns 14 and 15 locate themselves behind the border strips 10 and 11. After adjustment of the setting member 4 the mounting of the thermostatic valve is completed.

The embodiment illustrated in FIGS. 5 to 7 differs essentially from the embodiment described above only in the different mounting of the pivotally movable arm and by a different connection of the piston 2 with the shackle 3. As shown especially in FIG. 6 and FIGS. 7a, 7b, the connection of the arm 19 with the valve seat ring 15 is obtained in this embodiment by means of a T-shaped guide slot or recess. The upper part of arm 19 is T-shaped or may also be of dovetail shape. The guiding parts are tapered in the direction toward the expansion element. In this manner wedging or tilting of the arm 19 after mounting is made impossible, and therefore a connection of both parts in the manner of a wedge is obtained. The mounting can be effected in the manner described above.

The piston 2 is itself provided with a thread and engageable with a thread 20 in the arm 3. Thus in this embodiment the insert 4 is eliminated.

The invention is not limited to the embodiments illustrated and described. It comprises also all partial and sub-combinations of the described and/or illustrated features. In particular, the construction of the valve disk 12 may differ. In lieu of a pressure spring 13 a tension spring may be provided where the biasing of the spring is correspondingly modified. Furthermore, it is possible to provide venting apertures or the like known per se in the valve seat ring 5.

Having now described my invention with reference to the embodiments illustrated I do not wish to be limited thereto but what I desire to protect by Letters Patent is set forth in the appended claims.

I claim:

1. Thermostatic valve for use in controlling the cooling agent in internal combustion engines or the like, said valve comprising, in combination, a valve seat ring, a valve disk, an expansible element associated with said valve disk and movable therewith relative to said valve seat ring, said expansible element having a piston, a closure spring biasing said valve disk and said expansible element against said valve seat ring, retaining means for said piston and for said spring comprising a shackle extending upwardly from said valve seat ring and adjustably receiving the upper end of said piston, and a plurality of arms extending downwardly from said ring, said arms having lower ends defining a support for said spring and a guiding aperture for said expansible element, at least one said arm being rigidly connected with said valve seat ring and at least another said arm having interengaging means at its upper end and being supported thereby proximate the lower side of said ring for movement outwardly relative thereto.

2. Thermostatic valve for use in controlling the cooling agent in internal combustion engines or the like, said valve comprising, in combination, a valve seat ring, a valve disk, an expansible element associated with said valve disk and movable therewith relative to said valve seat ring, said expansible element having a piston, a closure spring biasing said valve disk and said expansible element against said valve seat ring, retaining means for said piston and for said spring comprising a shackle extending upwardly from said valve seat ring and adjustably receiving the upper end of said piston, and a plurality of arms extending downwardly from said ring, said arms having lower ends defining a support for said spring and a guiding aperture for said expansible element, at least one said arm being rigidly connected with said valve seat ring and at least another said arm being pivotally supported proximate the lower side of said ring by means of a horizontally disposed pivot pin.

3. Thermostatic valve for use in controlling the cooling agent in internal combustion engines or the like, said valve comprising, in combination, a valve seat ring, a valve disk, an expansible element associated with said valve disk and movable therewith relative to said valve seat ring, said expansible element having a piston, a closure spring biasing said valve disk and said expansible element against said valve seat ring, retaining means for said piston and for said spring comprising a shackle extending upwardly from said valve seat ring and adjustably receiving the upper end of said piston, and a plurality of rigid arms extending downwardly from said ring, said arms having lower ends defining a support for said spring and a guiding aperture for said expansible element, at least one said arm being rigidly connected with said valve seat ring and at least another said arm being movably supported by T-shaped interengaging means below said ring.

4. Thermostatic valve for use in controlling the cooling agent in internal combustion engines or the like, said valve comprising, in combination, a valve seat ring, a valve disk, an expansible element associated with said valve disk and movable therewith relative to said valve seat ring, said expansible element having a piston, a closure spring biasing said valve disk and said expansible element against said valve seat ring, retaining means for said piston and for said spring comprising a shackle extending upwardly from said valve seat ring and adjustably receiving the upper end of said piston, and a plurality of rigid arms extending downwardly from said ring, said arms having lower ends defining a support for said spring and a guiding aperture for said expansible element, at least one said arm being rigidly connected with said valve seat ring and at least another said arm being supported below and for movement relative to said ring, said arms presenting at their lower ends inwardly extending sector-shaped spring supporting surfaces.

5. Thermostatic valve for use in controlling the cooling agent in internal combustion engines or the like, said valve comprising, in combination, a valve seat ring, a valve disk, an expansible element associated with said valve disk and movable therewith relative to said valve seat ring, said expansible element having a piston, a closure spring biasing said valve disk and said expansible element against said valve seat ring, retaining means for said piston and for said spring comprising a shackle extending upwardly from said valve seat ring and adjustably receiving the upper end of said piston, and a plurality of arms extending downwardly from said ring, said arms having lower ends defining a support for said spring and a guiding aperture for said expansible element, at least one said arm being rigidly connected with said valve seat ring and at least another said arm having interengaging means at its upper end and being supported thereby below and for movement relative to said ring, said arms presenting at their lower ends horizontally extending sector-shaped supporting surfaces and having arcuate border strips adapted to receive the lower end of said spring.

6. Thermostatic valve in accordance with claim 5, where said border strips are of a height corresponding substantially to the extent of two coils of said spring.

7. Thermostatic valve in accordance with claim 6, where said supporting surfaces extend substantially through an angle of 120°.

8. Thermostatic valve for use in controlling the cooling agent in internal combustion engines or the like, said valve comprising, in combination, a valve seat ring, a valve disk, an expansible element associated with said valve disk and movable therewith relative to said valve seat ring, said expansible element having a piston, a closure spring biasing said valve disk and said expansible element against said valve seat ring, retaining means for said piston and for said spring comprising a shackle extending upwardly from said valve seat ring and adjustably receiving the upper end of said piston, and a plurality of arms extending downwardly from said ring, said arms having lower ends defining a support for said spring and a guiding aperture for said expansible element and one said arm being supported on said valve seat ring for movement below said ring and having interengaging means at its upper end and being supported thereby at the lower side of said ring.

References Cited

UNITED STATES PATENTS

| | | | |
|---|---|---|---|
| 2,981,477 | 4/1961 | Salmon | 236—34 |
| 3,146,946 | 9/1964 | Woods | 236—34 |
| 3,167,249 | 1/1965 | Moosmayer | 236—34 |

EDWARD J. MICHAEL, *Primary Examiner.*